United States Patent

Baird et al.

[11] Patent Number: 5,519,486
[45] Date of Patent: May 21, 1996

[54] METHOD OF CREATING HOLOGRAPHIC INTERFEROGRAMS FOR STRUCTURAL EXAMINATION OF COMPOSITES IN SHEET METAL SURFACES

[75] Inventors: John P. Baird, Via Hall; Robert K. Clark, Giralang, both of Australia

[73] Assignee: Unisearch Limited, Kensington, Australia

[21] Appl. No.: 81,320

[22] PCT Filed: Dec. 20, 1991

[86] PCT No.: PCT/AU91/00595

§ 371 Date: Jun. 18, 1993

§ 102(e) Date: Jun. 18, 1993

[87] PCT Pub. No.: WO92/11506

PCT Pub. Date: Jul. 9, 1992

[30] Foreign Application Priority Data

Dec. 20, 1990 [AU] Australia .................................. PK4034
Aug. 16, 1991 [AU] Australia .................................. PK7779

[51] Int. Cl.⁶ ............................................. G01B 9/025
[52] U.S. Cl. ........................... 356/35.5; 356/347; 73/802
[58] Field of Search ............................... 356/35.5, 347, 356/348; 73/800, 802

[56] References Cited

U.S. PATENT DOCUMENTS

| | | | |
|---|---|---|---|
| 3,587,301 | 6/1971 | Heary | 73/88 |
| 3,828,126 | 8/1974 | Ramsey, Jr. | 178/6.8 |
| 3,860,346 | 1/1975 | Kersch et al. | 356/109 |
| 3,911,733 | 10/1975 | Bhuta et al. | 73/88 |
| 4,139,302 | 2/1979 | Hung et al. | 356/32 |
| 4,464,052 | 8/1984 | Neumann | 356/347 |
| 5,065,331 | 11/1991 | Vachon et al. | 356/35.5 |
| 5,257,088 | 10/1993 | Tyson, II et al. | 356/35.5 |

*Primary Examiner*—Samuel A. Turner
*Attorney, Agent, or Firm*—Sughrue, Mion, Zinn, Macpeak & Seas

[57] ABSTRACT

In-situ, nondestructive examination to test the efficacy of a riveted, bolted or bonded join of metal sheets, or to test whether a composite material is faulted, or to test whether a multi-layer patch is bonded properly, involves the creation of an interferometric hologram. A photographic film or plate is mounted closely above, and isolated vibrationally from a region of a structure containing the join, composite material or patch. The film or plate is illuminated by the expanded beam from a laser firstly when the structure is in a first state of stress, and secondly when the structure is in a second state of stress (the change in stress being sufficient to deform the region over which the film or plate is mounted). At each illumination, a diffraction pattern is produced in the emulsion of the plate or film by interference between the illuminating beam and that part of it which is reflected from the region. The two diffraction patterns combine to produce a fringe pattern in the emulsion. That fringe pattern, when compared with the fringe pattern produced by a good join or a non-faulted composite body of patch, provides information about the region under investigation. The technique is especially useful for testing the joins in the skin of an aircraft fuselage, or potentially damaged composite structures.

16 Claims, 5 Drawing Sheets

METHOD OF CREATING HOLOGRAPHIC INTERFEROGRAMS FOR STRUCTURAL EXAMINATION OF COMPOSITES IN SHEET METAL SURFACES

TECHNICAL FIELD

This invention concerns the examination of structures using holographic interferometry. It is particularly suitable for the in-situ analysis of riveted, bolted and bonded structures to determine (a) the efficacy of the riveted or bolted joining or the bonding of components and (b) whether fatigue cracks are present in the region of the rivets or bolts. In this application, the invention is especially useful in the examination of the riveted, bolted and bonded connections in the fuselage of an aircraft which can be pressurised or otherwise loaded. Another particularly useful application of the present invention is the in-situ examination of objects constructed from composite materials, to ascertain the presence of damage to the object or the existence of faults as a result of poor construction. A further use of the present invention is the in-situ checking of the efficacy of the application of a composite patch to a damaged composite or aluminium structure or the like. In these last two applications, the present invention is particularly useful for (but is not limited to) the examination of objects made from a composite comprising a resin and fibres of boron, carbon, glass or the like.

BACKGROUND TO THE INVENTION

Structures which use high strength, light weight materials, and which are subject to considerable stress in their normal use, are susceptible to the development of fatigue cracks, particularly in the regions where the sheets of such materials are joined. One example of such a structure is a modern large aircraft, and as the development of the present invention was in part stimulated by the problem of crack detection in the fuselage of a large aircraft, the application of the present invention to this problem will be given some prominence in this specification.

The cause of a significant number of aircraft accidents has been identified as structural failure resulting from the development of fatigue cracks and faulted bonds in the aircraft fuselage, in the vicinity of the riveted connection of the metal sheets forming the fuselage. Thus it is now recognised that the detection of fatigue cracks in aircraft structures, as soon as possible after their formation, is a matter of critical importance, and there has been a considerable commitment of resources to the establishment of a reliable in-situ crack detection technique.

Several commercial crack detection systems are now available. Those systems include eddy current detection techniques, ultrasonic examination techniques and magnetic rubber applications. Unfortunately, each of those techniques is suitable for only a certain limited range of applications, since the sensitivity of each method depends on the geometry of the component being investigated and other factors. Optical techniques for crack analysis using phenomena such as photoelasticity, caustics, moire pattern observations and shearography have also been developed, but those optical techniques (apart from shearography) are laboratory analysis tools and are not readily able to be adapted to in-situ testing of riveted, bolted or bonded structures. Thus there remains a need for a reliable in-situ crack detection system for use in the testing of joins in aircraft fuselage structures.

The present invention, as noted above is also useful in the examination of composite materials, known generally as "composites". Composites comprising resin with fibres of boron, carbon, glass or the like are now being used regularly to construct objects and structures for which the combination of mechanical strength and light weight is desirable. An example of such an object is the rotor blade of a helicopter.

One problem with such objects is that faults in the manufacture of the composite, which may affect the structural strength of the object, are often not visible. Another problem, arising out of the use of such objects, is that, if they receive a substantial blow during their normal use (for example, a bird strike on a helicopter rotor), the structural integrity of the composite material can be affected (that is, the object can be damaged) with no visible indication of the fact that the object has received a blow.

A particular problem experienced with such composite materials is that when they have been visibly damaged and have been patched (sometimes using as many as 30 layers of the patching composite material), there is no means of knowing whether the patch has been applied properly. A weak bond obtained during the patching process can result in the catastrophic failure of an object made from the composite material, without any warning. Similarly, there is currently no satisfactory technique available to test whether a boron composite patch, applied to an aluminium structure (for example, in the repair of an aircraft fuselage), has bonded properly to the substrate material.

One technique that has been used to test the structural integrity of objects made from such composite materials is the technique known as "shearography". This technique is described in some detail in the paper by Y Y Hung entitled "Shearography: A Novel and Practical Approach for Nondestructive Inspection", which was published in the Journal for Nondestructive Evaluation, Volume 8, 1989, pages 55 to 67. It is also described in the paper by S. L. Toh, H. M. Shang, F. S. Chau and C. J. Tay entitled "Flaw Detection in Composites using Time-average Shearography", which was published in Optics & Laser Technology, Volume 23, 1991, pages 25 to 30.

Briefly, shearography involves the imaging of a small region of the surface of an object being tested on a photographic film or plate which is positioned at an image plane that is remote from that region. The region is illuminated by the expanded beam from a laser. The image is produced from the reflection of the laser light using an "image-shearing camera", which produces a pair of laterally sheared images in the image plane. These images overlap and produce a speckled random interference pattern over the image. When the object is deformed (for example, by vibration), the displacement of the reflected, interfering beams modifies the speckle pattern. Toh et al, in their aforementioned paper, show that if the object is continuously vibrated, a time averaged "shearogram" is produced in the photographic emulsion. The shearogram can be reconstructed using a white light source. If there is a flaw in the region of the object under investigation (for example, a crack), the image of the shearogram is noticeably different over the region of the flaw, provided the object has been vibrated at approximately the resonance frequency of the flaw (which is invariably a much higher frequency than the natural resonance frequency of the object). While the technique described by Toh et al is no doubt capable of showing the presence of a flaw which is suspected, it is a cumbersome and time-consuming technique, requiring the production of shearograms for a range of frequencies. As Toh et al point out in their paper:

"As in holographic interferometry, the time-average technique in shearography is only applicable to steady state vibration studies".

In addition, if a region of a composite object which may be damaged is being investigated, the failure to detect a flaw does not necessarily mean that no flaw is present, unless observations of that region have been carried out over a wide range of closely-spaced vibration frequencies.

The holographic interferometry technique referred to by Toh et al is described in some detail in the paper by D. B. Neumann and R. G. Penn entitled "Off-table Holography", which was published in Experimental Mechanics, June 1975, pages 241 to 244. That technique utilises a laser with a spatial filter to illuminate a photographic plate which is attached to, but is spaced a short distance from, the surface of a solid structure. A diffraction pattern is recorded in the emulsion of the photographic plate. The diffraction pattern is produced by the interference of the illuminating laser beam and that portion of the illuminating beam which has passed through the plate and has been reflected from the region of the surface over which the plate has been positioned. If a second exposure is taken on the same photographic plate at a different stress level of the object, the two diffraction patterns combine to give a fringe pattern when the developed emulsion is observed in appropriate lighting.

The paper by Neumann and Penn illustrates the use of the holographic interference technique to show structural deformations in thick vibrating structures. It draws attention to the relatively low cost of such an analysis technique. However, it stresses the need for the surface that is being examined to be coated with a retro-reflective paint or tape, which restricts the uses to which the technique can be put. Indeed, Neumann and Penn effectively limit the application of their technique to an analysis of the deformations observable in large objects which have vibratable surface areas.

DISCLOSURE OF THE PRESENT INVENTION

It is an object of the present invention to provide a reliable, easy to use, in-situ method for examining the structural integrity of riveted, bolted or bonded joins in sheet metal structures, composite materials that may have suffered damage or be faulty, and patches applied to a damaged composite material or metal sheet.

This objective is achieved using a modified form of the holographic interferometry technique described in the aforementioned 1975 paper by Neumann and Penn.

The present inventors have found that if a riveted or bolted join is subjected to two stress states and a holographic interferogram is made of that join, the interference patterns which are observed (i) for an effectively riveted or bolted join,
(ii) for a join in which a rivet or bolt is present but serves as a pin rather than as a clamp, and
(iii) for a join which has been stressed to the point where a crack has formed in the material lying under the domed head of a rivet or the head of the bolt are different from each other, but are consistent in their differences so that the quality of the join can be assessed from the features of the interference pattern.

The present inventors have also discovered that, contrary to the findings of Neumann and Penn, it is not necessary to apply a retro-reflective medium to the surface of the region being analysed, for interference patterns can be detected using the reflected laser light from a metallic surface, provided the surface roughness is not sufficient to introduce excessive background "noise" to the reflected light (in which case, a simple polishing of the surface will usually reduce the background noise, although experience has shown that in most cases the existing surface finish is adequate). In fact, the use of a retro-reflective surface can randomise the polarisation of the reflected light, which is not preferred (it is necessary, for good quality fringes, to have the reflected light with the same polarisation as the incident light).

Furthermore, the present inventors have also discovered that the holographic interferometry technique can be used for sub-surface crack detection in thin structures such as riveted, bolted or bonded sheets, in composite bodies, and for detection of non-bonded areas in multi-layer patches applied to the surface of a metal sheet or composite body.

Additionally, the present inventors have ascertained that their use of a modified holographic interferometric technique can reveal cracks and non-bonded regions or zones which are not detected by the known techniques, noted above, which use eddy currents, ultrasound or magnetic rubber.

Thus according to the present invention, a method of examining a region of a surface of a composite material or a region of a sheet metal surface which contains within the region a riveted, bolted or bonded join, composite material, multi-layer patch, or the like, comprises the sequential steps of:

(a) mounting using vibration isolating pods, a photographic plate or film over, but spaced a small distance from the region;

(b) illuminating the region with an expanded beam of a laser for a predetermined period, the laser beam passing through the plate or film to reach the region and be reflected from it, the reflected beam also passing through the plate or film;

(c) applying stress to, or changing the stress applied to, the region so that there is a slight distortion of the region caused by the change in the stress thereof;

(d) illuminating in the same manner a steps (b), the region and the photographic plate or film with the same expanded laser beam for a second predetermined period, whereby a holographic interferogram is created within the emulsion of the photographic plate or film; and (e) comparing the fringes of the holographic interferogram thus obtained in the emulsion of the plate or film with the fringes of a holographic interferogram from a correctly riveted, bolted or bonded join, undamaged or non-faulted composite material, properly bonded multi-layer patch, or normal state of the region, as the case may be, to determine the presence of any structural defect in the region.

Normally the first and second periods of illumination of the region will be the same length of time.

The comparison of the holographic interferograms may be effected by digitising the fringe patterns and performing the comparison using appropriate computer software.

This examination method is especially suitable for the examination of thin structures, where there is significant deformation of the structure when its stress level is changed.

Embodiments of the present invention will now be described, by way of example only, with reference to the accompanying drawings.

DETAILED DESCRIPTION OF THE ILLUSTRATED EMBODIMENTS

Figure 1A:
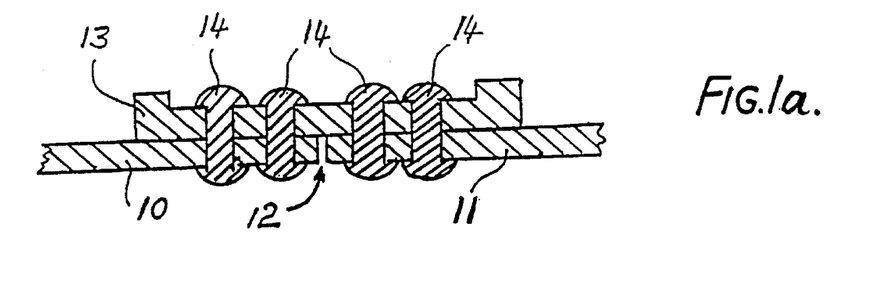
FIGS. 1a and 1b are sectional views, showing the two conventional ways in which sheets of aluminium may be joined, using rivets, in an aircraft fuselage.
Figure 1B:
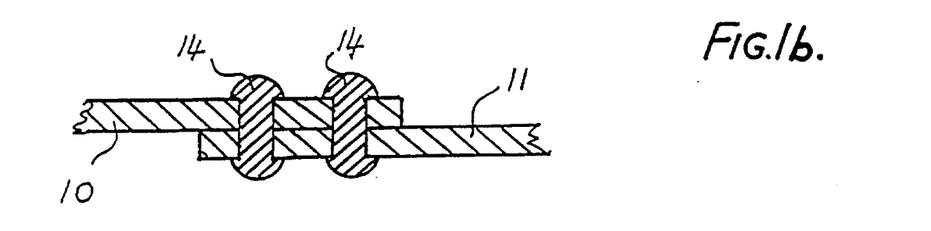

A modern aircraft is essentially a thin-walled pressure vessel made from sheet aluminium which has a thickness of from 1 mm to 2 mm. The aluminium sheets are joined by rivets as shown in FIG. 1a or FIG. 1b. In the FIG. 1a type of join, the abutting metal sheets 10 and 11 have their seam 12 covered by an aluminium strip 13 which is connected to the sheets 10 and 11 by a series of rivets 14. In the illustrated arrangement, the rivets have domed heads which are proud of the surfaces being connected by the rivets, but in practice the rivets will often be countersunk.

In the FIG. 1b arrangement, there is a simple lapped join of the aluminium sheets 10 and 11, with rivets 14 at regular spacing to secure the sheets 10 and 11 to each other. Again, the rivets are shown as domed head rivets but they may be countersunk. In the FIG. 1b arrangement, there is a tendency for the lapped join to tip about an axis, which is approximately at the centre of the line of rivets, when a load is applied to the structure.

When the joins shown in FIGS. 1a and 1b are first effected, the act of rivetting creates a solid join. When loads are applied to the join, it is found that one or two rivets in each of the series of rivets take the load initially, but after the load has been removed and reapplied several times, it becomes more evenly distributed between the rivets. Nevertheless, it is not uncommon for loose rivets to be found in a join, which take little or none of the applied load. Such loose rivets can be detected using the present invention.

A similar situation exists when bolts are used instead of rivets (which is sometimes the case in aircraft construction, particularly when metal sheets are being attached to a more substantial sub-surface member).

In an aircraft, the load on the joins in the fuselage is applied when the aircraft fuselage is pressurised. If cracks develop adjacent to a rivet or bolt as a consequence of fatigue resulting from many cycles of pressurisation and decompression, the crack may be potentially dangerous if it reaches the edge of a domed head of a rivet or bolt. Unfortunately, as noted above, hitherto there has been no reliable in-situ nondestructive technique for observing the presence of a crack before it grows to its potentially dangerous size. Such a technique is needed because of the possibility of the occurrence of what structural engineers call "multi-site damage". Multi-site damage exists when a number of small cracks are present in a structure. Individually, each small crack is unlikely to have a significant effect upon the structure. Collectively, however, the cracks can constitute a substantial weakening of the structure and create a very dangerous situation.

Figure 2:
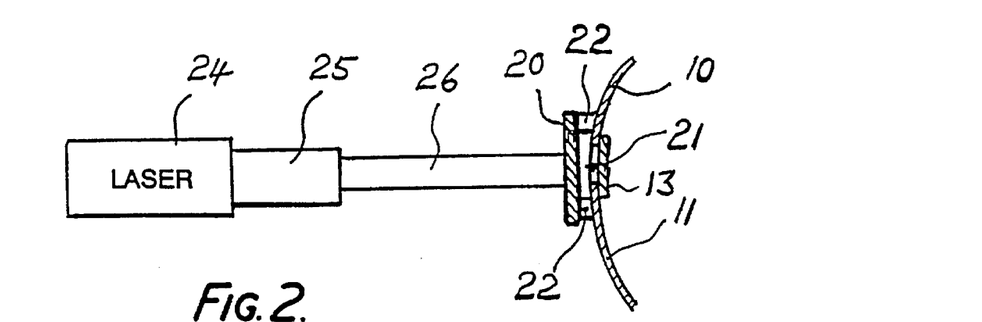
FIG. 2 is a partly schematic illustration of the adoption of the present invention to the analysis of a riveted join in the fuselage of an aircraft.

FIG. 2 shows the way in which the present invention is used to investigate the reliability of riveted join in the fuselage of a aircraft or a similar sheet metal structure. A photographic film or plate 20 is mounted over the region 21 of a riveted join of the metal sheets 10 and 11 of the fuselage (or other structure). This mounting can conveniently be effected using double-sided adhesive tape 22 (shown much thicker than is the case in reality, due to the schematic nature of FIG. 2) near the edge of the film or plate 20. The important features of the mounting arrangement are (i) that there is a small space between the emulsion of the film or plate and the closest surface of the region of the join, and (ii) the spacers must isolate the film or plate 20 vibrationally (and therefore structurally) from the region being investigated, so that the film or plate is not distorted when the stressing of the underlying region is changed. Double-sided adhesive tape has been found to be ideal for such mounting.

If the surface over which the plate or film 20 is mounted is very rough, it may be necessary to polish that surface before mounting the photographic film or plate 20 as shown in FIG. 2. In most instances, however, and almost always when the join is in the skin of a large aircraft, the metallic or painted surface as manufactured will be adequate to enable a good holographic interferogram to be obtained without the need for polishing. The limiting factor for the resolution of small fringes (see below) is the background noise caused by surface roughness. The scale of any roughness of the region 21 should be smaller than the fringe spacing. Using the present invention, fringes as close as 50 micrometers can be routinely detected.

A laser 24, equipped with a spatial filter and beam expander 25, is mounted a distance from the photographic film or plate 20, so that a laser beam 26 is incident upon the plate 20. The distance between the laser 24 and the plate 20 is not critical. Normally, the laser 24 and its associated spatial filter and beam expander will be mounted on a tripod (not shown in FIG. 2). However, use of a tripod is not essential. Indeed, good quality interferograms have been obtained by the present inventors using a hand held laser.

Figure 3:
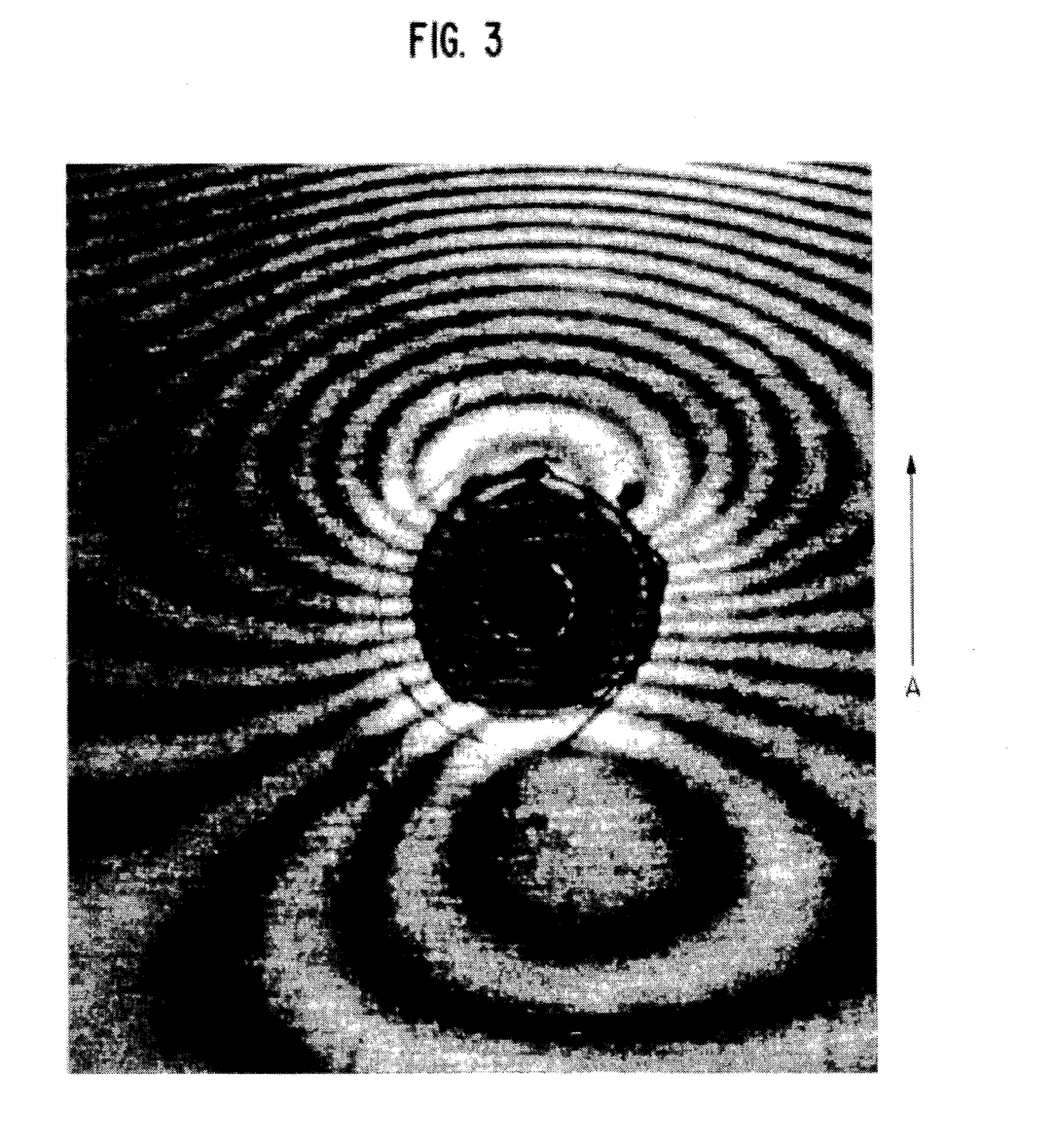
FIG. 3 is a holographic interferogram of a correctly riveted join.
Figure 4:
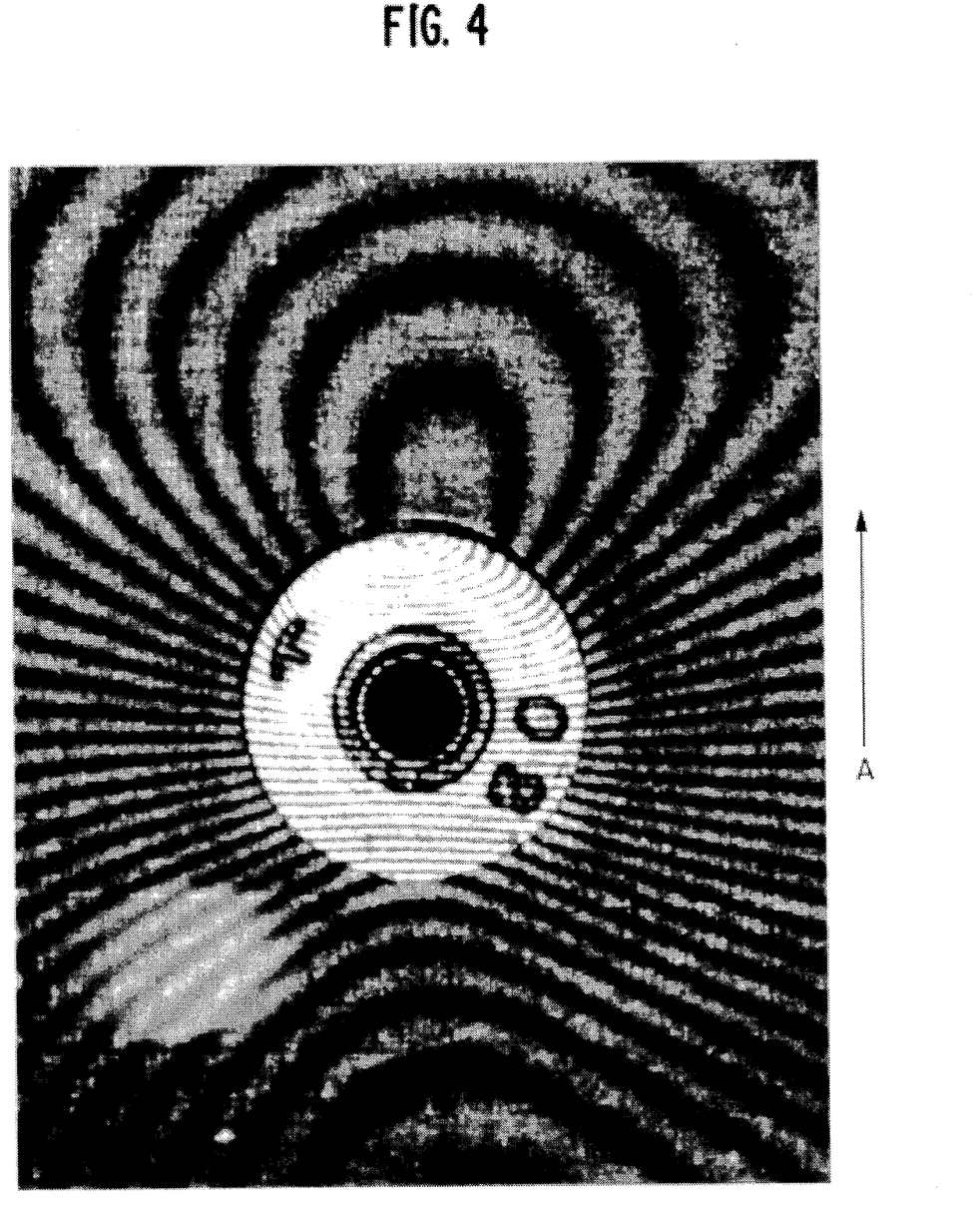
FIG. 4 is a holographic interferogram obtained from a riveted join with a crack present under the domed head of the rivet.

The plate or film 20 is first exposed to the laser beam 26 with the fuselage in a pre-determined state of stress. The stressing of the fuselage is then changed (usually, it is pressurised, having been unpressurised previously) and the film or plate is exposed to the laser beam 26 again. Usually the time of each exposure is the same. Subsequent development of the film or plate reveals the presence of fringes covering the image in the emulsion. Examples of such fringes are shown in FIGS. 3 and 4. The fringes are caused by the interference between the two diffraction pattern images in the emulsion, due to variations (when the stressing of the structure was changed) in the path lengths of the beams travelling between the photographic emulsion and the surface of the fuselage, and reflected back to the emulsion. The differences in the path lengths are caused by the relative distortions between the two stress levels in the aircraft skin. Abnormalities in the skin caused by a less than effective join in the region 21, or by the presence of a crack under the head of a rivet or bolt, or under the strip 13 covering the join (if the FIG. 1a arrangement is used) give rise to abnormal fringe patterns.

A holographic interferogram, obtained using the present invention, of a good riveted join is shown in FIG. 3.

The arrow A in FIG. 3 indicates the direction of the load applied to the rivet. It will be noted that circular fringes appear above and below the rivet in FIG. 3.

FIG. 4 is a holographic interferogram, also obtained using the present invention, of a second riveted join. The direction of the applied load is again indicated by an arrow A. In this instance, a crack was present under the head of the rivet. It will be noted that the fringes above the rivet (in the Figure) are nearly circular, whereas the fringes below the rivet have a totally different pattern.

Although any abnormal fringe pattern-shows the presence of a faulty join in the vicinity of the rivet or bolt, it is possible to categorise the nature of the fault in the join from the nature of the fringe pattern that is observed using the present invention. In a development of the present invention, the standard fringe pattern is digitised and stored in a computer memory, and the observed fringe pattern is also digitised. A comparison between the observed and standard fringe patterns can then be effected, using appropriate computer software, to detect imperfect joins.

Figure 5:
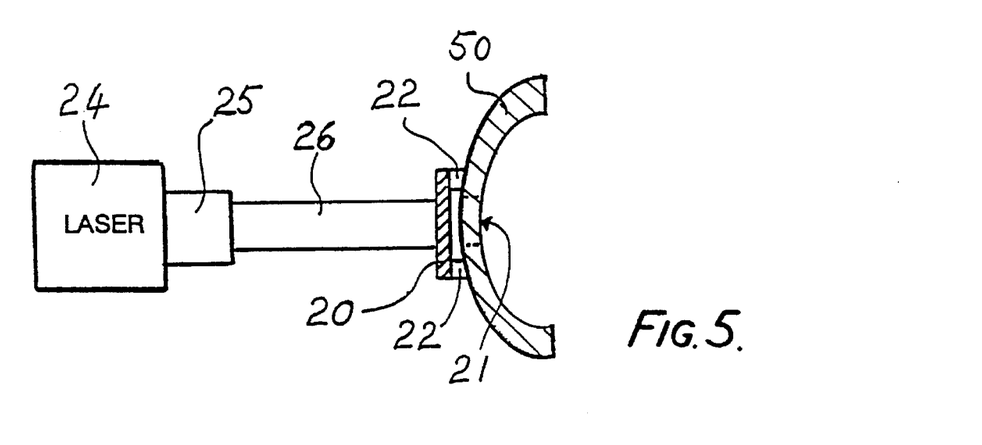
FIG. 5 is a partly schematic illustration of an arrangement used for examining a region of an object made from a composite material, using the present invention.

In the arrangement for investigating the structural integrity of a composite body which is illustrated schematically in FIG. 5, a photographic film or plate 20 is mounted over a region 21 on the surface of an object 50 (such as the rotor blade of a helicopter) constructed using a fibre composite material (typically a carbon fibre composite). The photographic film or plate is mounted so that there is a small spacing between the emulsion of the film or plate and the adjacent surface of the region 21 and the plate or film is vibrationally isolated from the object 50. As noted above, such a mounting arrangement is conveniently effected using strips of double-sided adhesive tape 22 near to the edge of the film or plate 20.

When supporting the object 50 for the investigation of the region 21 using the present invention, it may be necessary —or convenient—to stress the object.

A laser 24, provided with a spatial filter and beam expands 25, is mounted a distance from the photographic film or plate 20, so that the expanded laser beam 26 is incident upon the film or plate. As noted in the description of FIG. 2, the distance-between the laser 24 and the film or plate 20 is not critical, and normally the laser with its spatial filter and beam expander will be supported by a tripod, or other suitable means for holding the laser in a required position.

The plate or film 20 is first exposed to the laser beam 26 when the object 50 is unstressed or in its initial stressed state. The object 50 is then stressed (or the stressing of the object is varied) and the film or plate is exposed to the laser beam 26 a second time. When the photographic film or plate is developed, fringes are present over the image in the emulsion. The fringes are caused by interference between the two images due to variations in the path lengths of the beams travelling between the photographic emulsion and the adjacent surface of the object 50, and reflected back to the emulsion. The differences in the path lengths are caused by the distortion (usually about 10 micrometers) of the surface of the object 10 when the stressing of the object is effected or changed. Abnormalities or flaws in the region 21 which is under the photographic film or plate 20, caused by fractured fibres in, or delaminations of, or weak bonding in, the composite material, give rise to abnormal fringe patterns.

It has been found that no treatment of the surface of the object 50 is necessary to ensure the production of good quality fringes in the holographic interferogram. The present invention has been used effectively with a composite body having a matt black surface, as well as with materials having (optically) highly reflective surfaces.

The arrangement shown in FIG. 5 is also used to investigate the bonding in a multi-layer patch applied to a damaged region of a composite material or metallic (for example, aluminium) structure. The testing of the bonding may be effected after each layer of the patch has been applied, or it may be used after the patching has been completed, to detect the presence of regions or zones of the patch layers which have not bonded properly.

Although any abnormal fringe pattern shows the presence of a fault in the composite material in the vicinity of the region 21, it is possible, with experience, to interpret the extent of the damage to the fibres of the composite material, or the extent of the non-bonding of a patch layer (as the case may be), from the nature of the distortion of the fringes.

As in the analysis of riveted, bolted or bonded joins, the standard fringe patterns for composites and patches may be digitised and stored in a computer memory, and the observed fringe pattern also be digitised. The observed and standard fringe patterns can then be compared, using appropriate computer software, to detect damaged regions of the composite material, or imperfect patching.

When using the present invention to examine the structural integrity of-riveted, bolted or bonded joins in the fuselage (or in other parts) of an aircraft, the aircraft should be placed in a darkened hangar and illuminated only by light having a wavelength to which the emulsion of the photographic film or plate is insensitive. If a dark hangar is not available, a shroud to darken one section of the aircraft may be used. The choice of laser will also depend upon the wavelength range to which the emulsion of the photographic plate is sensitive. For example, red light illumination of the aircraft will be used when the emulsion is sensitive to ultra-violet wavelengths.

Similarly, when using the present invention to examine the structural integrity of an object made with a fibre composite material, the object will normally be placed in a darkened room (or covered with a shroud) and illuminated only by light having a wavelength to which the emulsion of the photographic film or plate is insensitive.

Figure 6:
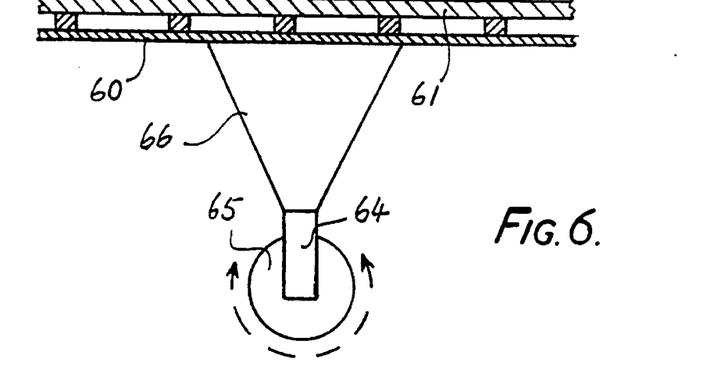
FIGS. 6 and 7 are partly schematic plan and elevation views of an arrangement for examining a large region of an aircraft fuselage without repositioning the laser mount.
Figure 7:
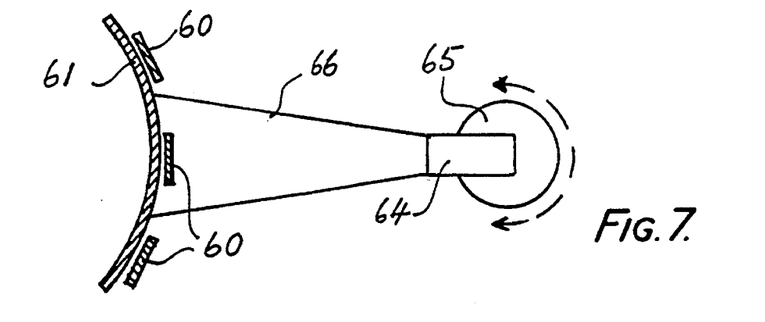

In a further development of the present invention, in its application to aircraft fuselage testing, holographic interferograms may be taken of large regions of an aircraft fuselage, using the arrangement shown in FIGS. 6 and 7. In this arrangement, a film strip or a series of photographic plates 60 is positioned a short distance above the joins in a section of an aircraft fuselage 61. A laser 64 with an associated spatial filter and beam expander is mounted on a two-axes positioning device 65 of known construction. The laser 64 generates an expanded laser beam 66 which is scanned over the entire length of the film strip or plates 60 by the oscillation of the laser about the axes of the device 65. In a preferred embodiment of the arrangement shown in FIGS. 6 and 7, the movement of the laser 64 is controlled by a computer (using known technology). Fringes in the emulsion of the strip or plates 60 are created in each region of the section of the fuselage over which the laser beam is scanned (firstly when the fuselage is unpressurised, then again when the fuselage is pressurised). Thus examination of the fringe patterns created in the emulsion provides information about the efficacy of each rivet, bolt or bond in the section being investigated. The maximum extent of the region of fuselage that can be covered by the arrangement shown in FIGS. 6 and 7 depends upon the contours of the fuselage. Typically, the system is effective until the plane of the photographic film or plates is at about 30° to the laser beam.

It is to be expected that it will not always be convenient to darken a hangar and perform the pressurising and depressurising of an aircraft while examining riveted, bolted or bonded joins using the present invention as described above. In many instances, it will be desirable to have other work carried out on the aircraft while the integrity of the sheet metal joins is assessed. Accordingly, the present inventors have devised the equipments featured in FIGS. 8 and 9.

Figure 8:
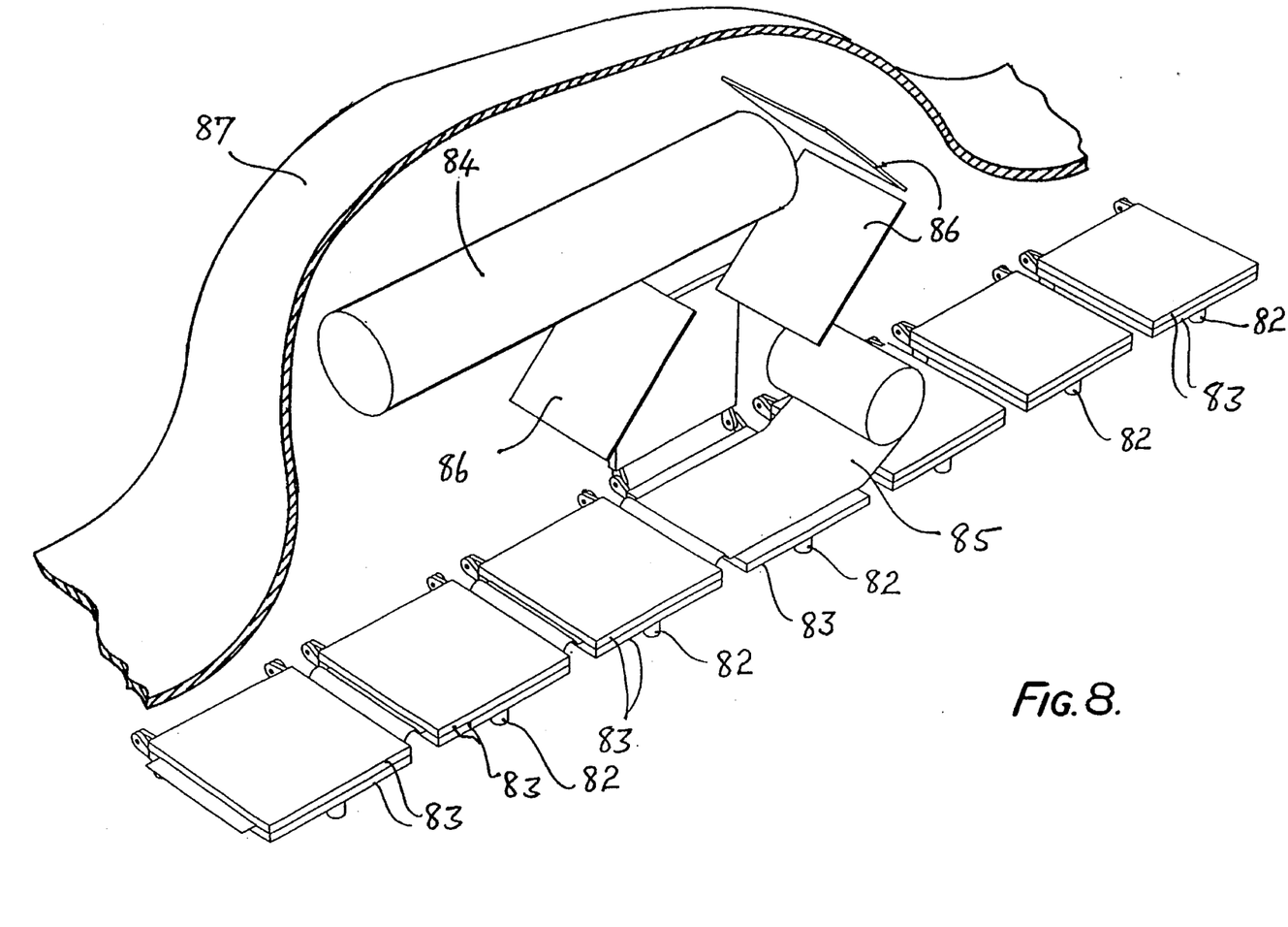
FIG. 8 illustrates (partly schematically) equipment which may be used to examine the structural adequacy of a long join in an aircraft fuselage.

The equipment featured in FIG. 8 uses a laser 84 mounted on a travelling support (not shown in FIG. 8) which runs along tracks (also not shown in FIG. 8) which are laid on the surface of the fuselage so that the laser 84 runs over the joins in the skin of the fuselage. An array of double glass plates 83 is mounted (using vibration isolating mounts 82) a short distance above the lines of a long join.

As the laser moves slowly over the linear array of glass plates, a rectangular portion of a strip of photographic film 85 is laid between each pair of glass plates, and a first exposure is made of each rectangular portion. A flexible cover or shroud 87 covers the entire assembly of tracks, glass plates, travelling supports, photographic strip and laser (with its associated mirrors 86) and has its edges sealed against the fuselage to prevent the ingress of unwanted light.

The laser 84 moves over the entire length of the photographic strip 85 when the fuselage is in a first stressed state. Then the stress applied to the fuselage is changed and the laser is moved back to its starting position. A second exposure of each rectangular portion of the strip is made while the laser returns to its starting position, to obtain interference fringes in the image in the emulsion of the strip. Subsequently, analysis of the fringes (after developing the film strip) is carried out to assess the integrity of each join covered by the film strip.

It is not necessary to pressurise the entire aircraft to apply a stress to a region of the fuselage. Stressing or loading of a region of fuselage can be effected by applying two vacuum pads, each with a lever extending away from the fuselage but rigidly attached to the pad, to the fuselage surface near each end of the region being investigated. To change the load on the region of fuselage, the outer end of each lever is moved towards, or away from, the other lever. Such a load-applying arrangement is particularly useful when it would be inconvenient to pressurise the entire aircraft.

Figure 9:
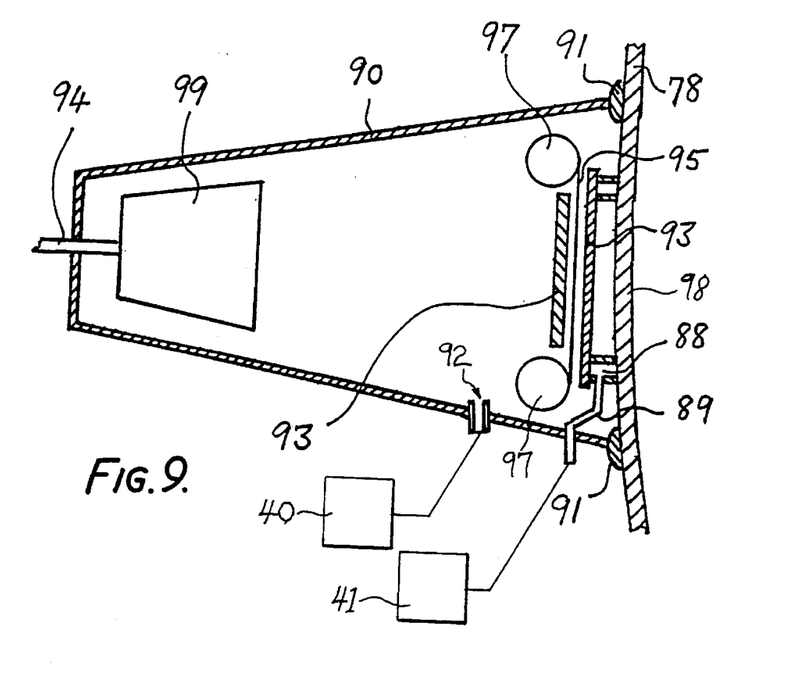
FIG. 9 is a partly schematic drawing which illustrates another embodiment of equipment that may be used in the examination of joins in an aircraft fuselage.

Another embodiment of the join inspection equipment for an aircraft fuselage, that can conveniently be used with a vacuum pad loading arrangement of this type, is shown in FIG. 9. This inspection equipment can be used, in effect, to take snapshots of joins. It comprises a light-tight box 90 (like a large camera body) which is provided with a seal 91 around its edge which is positioned close to the surface of the fuselage 98. The box 90 is connected via outlet 92 to a source 40 of low vacuum, which reduces the pressure in the box 90 to enable it to be held in any required position on the fuselage, or to apply a load to the zone of the fuselage structure surrounded by the seal 91.

Within the box 90 there is a length of film 95 which is wound around two spools 97. A pair of glass plates 93 is mounted between the spools 97, so as the film 95 is wound from one spool 97 and onto the other spool 97, it passes between the glass plates. The glass plate which is nearest to the fuselage has evacuable feet 88, connected via a length of hose 89 to a higher vacuum system 41, which is used to "clamp" the feet 88 against the fuselage.

Light from a laser is conducted to a lens system 99 within the box 90 by an optical fibre 94. The lens system expands the output from the optical fibre 94, so that the region of fuselage under the glass plates is illuminated.

To investigate a join of the fuselage, the glass plates, and thus the box 90 also, are positioned over the join and both the low vacuum and higher vacuum systems are activated to effectively clamp the glass plates and the box 90 in position. A fresh length of the film strip 95 is positioned between the glass plates by winding it off one of the spools 97 (the other spool 97 taking up unwanted film). The film is the illuminated with the vacuum pad arrangement creating a first stress over the join being checked. The vacuum pad levers are then moved to change the load applied to the fuselage and the film strip between the glass plates is illuminated again, to form fringes in the image in the emulsion of the film, as described above. Alternatively, a change in the low vacuum in the box 90, or other means, may be used to load the structure.

One possible disadvantage with the use of a vacuum pad arrangement to stress, or modify the stress applied to, a region of the fuselage of an aircraft is that the loading able to be created by the use of vacuum pads is not the same as the loading actually experienced in flight, when the aircraft fuselage is pressurised. However, the present invention is not limited to aircraft fuselage examination, but is suitable for use with any thin metal structure, and when a riveted, bolted or bonded join is being examined using the present invention, and the join is not in the fuselage of an aircraft, any suitable means of applying a load to the join may be used.

A particularly important feature of the present invention, in its application to the testing of composites and multi-layer patches, as well as bolted, bonded and riveted structures, is its ability to detect almost any abnormality in the region being investigated which is sufficient to change the way in which the structure takes a load. Thus it is not only surface defects that are detected by the present invention.

It should be appreciated that specific embodiments of the present invention have been illustrated and described above, but variations to or modifications of the illustrated and described embodiments can be made without departing from the present inventive concept. One example of such a modification is shown in FIG. 9, where light from a laser is supplied to the region of the test via an optical fibre, and an expanded laser beam is created using a lens system.

We claim:

1. A method of examining a region of a surface of a composite material or a region of a sheet metal surface which contains within said region a riveted, bolted or bonded join or a multi-layer patch, said method using a photographic emulsion supported on an optically transparent emulsion support member, said method comprising the sequential steps of:

(a) mounting said emulsion support member over, but close to said region by supporting said plate or film on pads positioned on said surface, said pads vibrationally isolating said emulsion support member from said surface;

(b) illuminating said region for a predetermined time with an expanded beam from a laser, said beam passing through said photographic emulsion and said emulsion support member to impinge upon said region and be reflected from said region, said reflected beam passing through said photographic emulsion and said emulsion support member;

(c) applying stress to, or changing the stress applied to, said region so that there is a slight distortion of said region caused by the change in the stress applied thereto;

(d) illuminating said region with the same expanded laser beam for a second predetermined period, in the same manner as in step (b), whereby a holographic interferogram is created within said emulsion; and (e) comparing the fringes of the holographic interferogram created in said emulsion with the fringes of a holographic interferogram obtained from the surface of an undamaged or non-faulted composite or from a region of a sheet metal surface containing a correctly riveted, bolted or bonded join, or a properly bonded multi-layer patch, as the case may be, to determine the presence of any structural defect in said region.

2. A method as defined in claim 1, in which said first and second periods of illumination are substantially equal periods of time.

3. A method as defined in claim 2, in which said surface is a sheet metal surface, and said photographic emulsion and said emulsion support member comprise a strip of photographic film;

(a) said expanded laser beam is created within a light-tight housing by a lens system to which light from a laser is supplied via an optical fibre;

(b) said housing is open at an end thereof which is remote from said lens system, said open end being provided with a flexible seal, whereby a low vacuum system may be used to mount said housing in sealing arrangement against said sheet metal surface;

(c) said strip of photographic film is wound on a first spool but is transferable to a second spool, a portion of said film strip being sandwiched between a pair of thin glass plates located between said first and second spools;

(d) said spools and said thin glass plates are mounted within said housing adjacent to the open end thereof; and (e) one of said thin glass plates is mounted on hollow pads which are adapted to be secured against the surface of the sheet metal structure by suction applied by a second vacuum system.

4. A method as defined in claim 1, including the steps of digitising the pattern of the fringes obtained by step (d) and effecting the comparison of step (e) by comparing said digitised fringe pattern with the digitised fringe pattern of a correctly riveted, bolted or bonded join, or non-faulted composite material or properly bonded multi-layer patch.

5. A method as defined in claim 4, in which said surface is a sheet metal surface, and said photographic emulsion and said emulsion support member comprise a strip of photographic film;

(a) said expanded laser beam is created within a light-tight housing by a lens system to which light from a laser is supplied via an optical fibre;

(b) said housing is open at an end thereof which is remote from said lens system, said open end being provided with a flexible seal, whereby a low vacuum system may be used to mount said housing in sealing arrangement against said sheet metal surface;

(c) said strip of photographic film is wound on a first spool but is transferable to a second spool, a portion of said film strip being sandwiched between a pair of thin glass plates located between said first and second spools;

(d) said spools and said thin glass plates are mounted within said housing adjacent to the open end thereof; and (e) one of said thin glass plates is mounted on hollow pads which are adapted to be secured against the surface of the sheet metal structure by suction applied by a second vacuum system.

6. A method as defined in claim 1, in which said pads comprise pads of double-sided adhesive tape.

7. A method as defined in claim 1, in which (i) said surface is a sheet metal surface, (ii) said region is an extensive region, (iii) said emulsion and said emulsion support member comprise a strip of photographic film mounted over said region, and (iv) each illumination of said region and said photographic film is effected by scanning said laser beam over said region.

8. A method as defined in claim 7, in which said scanning of said laser beam is effected by rotational movement of the laser about a mounting position.

9. A method as defined in claim 7, in which said scanning of said laser beam is effected by moving said laser over the photographic film.

10. A method as defined in claim 7, in which the photographic film is sandwiched between the glass plates of an array of pairs of thin glass plates, each pair of thin glass plates in said array being mounted closely adjacent to the next pair of glass plates of said array.

11. A method as defined in claim 1, in which said surface is a sheet metal surface, said photographic emulsion and said emulsion support member comprise a strip of photographic film and (a) said expanded laser beam is created within a light-tight housing by a lens system to which light from a laser is supplied via an optical fibre;

(b) said housing is open at an end thereof which is remote from said lens system, said open end being provided with a flexible seal, whereby a low vacuum system may be used to mount said housing in sealing arrangement against said sheet metal surface;

(c) said strip of photographic film is wound on a first spool but is transferable to a second spool, a portion of said film strip being sandwiched between a pair of thin glass plates located between said first and second spools;

(d) said spools and said thin glass plates are mounted within said housing adjacent to the open end thereof; and (e) one of said thin glass plates is mounted on hollow pads which are adapted to be secured against the surface of the sheet metal structure by suction applied by a second vacuum system.

12. A method as defined in claim 1, in which said sheet metal surface is the skin of an aircraft.

13. A method as defined in claim 1, in which said emulsion and said emulsion support member comprise a photographic film and said film is sandwiched between a pair of glass plates.

14. A method as defined in claim 1, in which (i) said surface is a sheet metal surface, (ii) said region is an extension region, (iii) said photographic emulsion and said emulsion support member comprise a series of photographic plates which are mounted over said region, and (iv) each illumination of said region and said plates is effected by scanning said laser beam over said region.

15. A method as defined in claim 14, in which said scanning of said laser beam is effected by rotational movement of the laser about a mounting position.

16. A method as defined in claim 14, in which said scanning of said laser beam is effected by mounting said laser on a carriage and moving said carriage so that the expanded laser beam passes over said series of photographic plates.

* * * * *